(12) United States Patent
Kim et al.

(10) Patent No.: US 9,641,323 B2
(45) Date of Patent: May 2, 2017

(54) SECURITY PROCESSING SYSTEM AND METHOD FOR HTTP LIVE STREAMING

(71) Applicant: Alticast Corporation, Seoul (KR)

(72) Inventors: Chang Nam Kim, Gyeonggi-do (KR); Mi Sung Cho, Mapo-gu (KR)

(73) Assignee: Altricast Corporation, Seoul (KR)

( * ) Notice: Subject to any disclaimer, the term of this patent is extended or adjusted under 35 U.S.C. 154(b) by 359 days.

(21) Appl. No.: 13/691,152

(22) Filed: Nov. 30, 2012

(65) Prior Publication Data

US 2013/0136264 A1    May 30, 2013

(30) Foreign Application Priority Data

Nov. 30, 2011 (KR) .................. 10-2011-0127363

(51) Int. Cl.
*H04L 9/08* (2006.01)
*H04L 9/14* (2006.01)

(52) U.S. Cl.
CPC .............. *H04L 9/08* (2013.01); *H04L 9/0822* (2013.01); *H04L 9/14* (2013.01)

(58) Field of Classification Search
None
See application file for complete search history.

(56) References Cited

U.S. PATENT DOCUMENTS

| | | | | |
|---|---|---|---|---|
| 6,983,371 B1 * | 1/2006 | Hurtado | .................. | G06F 21/10 380/255 |
| 8,060,926 B1 * | 11/2011 | Ebrahimi | ................ | H04L 63/02 713/153 |
| 2002/0002468 A1 * | 1/2002 | Spagna | .................. | G06F 21/10 713/193 |
| 2002/0107803 A1 * | 8/2002 | Lisanke | .................. | G06F 21/10 705/51 |
| 2003/0105718 A1 * | 6/2003 | Hurtado | .................. | G06F 21/10 705/51 |
| 2003/0135464 A1 * | 7/2003 | Mourad | .............. | G06F 17/3089 705/50 |
| 2004/0083392 A1 * | 4/2004 | Yang et al. | ................... | 713/201 |
| 2006/0085343 A1 * | 4/2006 | Lisanke | .................. | G06F 21/10 705/50 |

(Continued)

*Primary Examiner* — Saleh Najjar
*Assistant Examiner* — Simon Kanaan
(74) *Attorney, Agent, or Firm* — Mintz Levin Cohn Ferris Glovsky and Popeo, P.C.; Kongsik Kim; Jonathon Western

(57) ABSTRACT

Disclosed are a security processing system and method for HLS transmissions. An aspect of the invention provides a content key conversion device connected over a network to a content proxy device configured to provide encryption key information to a content operating device for a content received from a content provider device of an external network. The content key conversion device includes: a reception part that receives a double encryption key of a content from the content proxy device; an interface part that receives key decryption information corresponding to the double encryption key from an encryption key provider device of an external network; a decryption part that decrypts the double encryption key of the content using the key decryption information and thereby converts the double encryption key to an encryption key; and a transmission part that transmits the encryption key converted by the decryption part to the content proxy device.

10 Claims, 5 Drawing Sheets

(56) References Cited

U.S. PATENT DOCUMENTS

| | | | |
|---|---|---|---|
| 2006/0089912 A1* | 4/2006 | Spagna | G06F 21/10 705/51 |
| 2007/0150478 A1* | 6/2007 | Cho | H04L 29/12113 |
| 2008/0141339 A1* | 6/2008 | Gomez | H04L 63/08 726/1 |
| 2010/0008500 A1* | 1/2010 | Lisanke | G06F 21/10 380/201 |
| 2011/0231660 A1* | 9/2011 | Kanungo | 713/168 |
| 2013/0163758 A1* | 6/2013 | Swaminathan et al. | 380/259 |

* cited by examiner

SECURITY PROCESSING SYSTEM AND METHOD FOR HTTP LIVE STREAMING

CROSS-REFERENCE TO RELATED APPLICATIONS

This application claims the benefit of Korean Patent Application No. 10-2011-0127363, filed with the Korean Intellectual Property Office on Nov. 30, 2011, the disclosure of which is incorporated herein by reference in its entirety.

BACKGROUND

1. Technical Field

The present invention relates to a security processing system, more particularly to a security processing system and method for HLS transmissions.

2. Description of the Related Art

Streaming refers to transmitting contents such as video or audio contents from a server to a client over a network such as the Internet. The term "streaming" was derived based on the observation that the transmitted data flows like a stream. The server separates a video content into packets that can be sent over a network, and the client assembles the packets and restores the original form before replay the video content. Here, the replaying of the content and the receiving of the packets occur concurrently, and the series of associated packets are referred to as a "stream".

Streaming, which involves replaying a content while the client is downloading it, is distinguished from a simple file transfer, which involves first receiving the entire video content and replaying the video afterwards. The client replays the content while receiving packets from the server, and then deletes the replayed data. A few examples of protocols for streaming files include the HTTP (Hypertext Transfer Protocol), FTP (File Transfer Protocol), RTP (Real-time Transport Protocol), RTSP (Real Time Streaming Protocol), HLS (HTTP Live Streaming), etc. Here, HTTP and FTP are essentially file transfer protocols, while RTP and RTSP are protocols for real-time file streaming.

Among the protocols above, HLS provides high security by employing an actual streaming method, instead of the conventional progressive download method, to prevent illegal copying of contents and by using the AES-128 data encryption technique to prevent unauthorized replaying.

By applying HLS, it is possible to provide video streaming services tailored to a mobile communication environment for various service providers in the fields of e-Learning, broadcasting, UCC, entertainment, etc. With a convenient environment established in which users may freely enjoy video contents even while moving, there have been increased sales of contents and increased amounts of data used, forecasting a potential for new areas of profit making.

It has been pointed out, however, that there is a problem in content security, because when a content supported by HLS is encrypted, the key information used in the content encryption is transmitted to a terminal together with the content information, and the key information can be easily extracted for decrypting the encrypted content. To complement this problem, it has been proposed to use HTTPS when transmitting the key information, but while HTTPS allows user authentication, it does not allow content authentication. As it is impossible to authenticate contents even when providing security by way of HTTPS, there is a need for content-based security, such as for controlling viewing authorization per content.

SUMMARY

An embodiment of the invention provides an HLS-based security processing system and method with which the key information used in encrypting a content can be provided safely from a server to a client.

Also, an embodiment of the invention provides an HLS-based security processing system and method with which the viewing authorization can be controlled on a per-content basis by using DRM (Digital Rights Management).

An aspect of the invention provides a content key conversion device connected over a local network to a content proxy device configured to provide encryption key information to a content operating device for a content received from a content provider device of an external network. The content key conversion device includes: a reception part configured to receive a double encryption key of a content from the content proxy device; an interface part configured to receive key decryption information corresponding to the double encryption key from an encryption key provider device of an external network; a decryption part configured to decrypt the double encryption key of the content using the key decryption information and thereby convert the double encryption key to an encryption key; and a transmission part configured to transmit the encryption key converted by the decryption part to the content proxy device.

In cases where the content provided by the content provider device is provided as data blocks of a particular size, the key decryption information can be provided for each data block or for each group of data blocks.

The content provider device can be configured to generate a first index file, which may include the address information of an encrypted content and the address information of the encryption key for decrypting the encrypted content; based on the first index file, generate a second index file, which may include at least one of the address information of the encrypted content, the address information of a double encryption key obtained by double-encrypting the encryption key using a key-encryption key, and the metadata of the key-encryption key; and, upon receiving a request to replay a content from a user, transmit the second index file of the requested content to the content proxy device.

The metadata of the key-encryption key can be recorded in the form of an annotation recognizable by the content key conversion device and the encryption key provider device.

The key decryption information can be the key-encryption key, the reception part can receive the key-encryption key metadata from the content proxy device, and the interface part can receive the key decryption information from the encryption key provider device by using address information included in the key-encryption key metadata.

Another aspect of the invention provides a content proxy device located in a local network. The content proxy device includes: a terminal connector part configured to connect with a content operating device over a local network and to receive a content request signal from the content operating device; a communication part configured to connect with a content provider device of an external network and receive a double encryption key of an encrypted content from the content provider device based on the content request signal received from the content operating device; a storage part configured to store the double encryption key received from the content provider device; a device connector part configured to transmit the double encryption key of the encrypted content to a content conversion device of the local network and to receive an encryption key, which may be obtained by decrypting the double encryption key of the encrypted content, from the content key conversion device; and a transmission part configured to transmit the encryption key converted by the content key conversion device to the content operating device.

The encrypted content can be divided into data blocks of a particular size, and the storage part can store the double encryption key information for each of the data blocks having a particular size.

The content provider device can be configured to generate a first index file, which may include the address information of the encrypted content and the address information of the encryption key for decrypting the encrypted content, and based on the first index file generate a second index file, which may include at least one of the address information of the encrypted content, the address information of a double encryption key obtained by double-encrypting the encryption key using a key-encryption key, and the metadata of the key-encryption key.

The communication part of the content proxy device can receive the second index file of a content requested by a user, and the device connector part can transmit to the content key conversion device the double encryption key obtained using the double encryption key address and the key-encryption key metadata for decrypting the double encryption key included in the second index file.

The metadata of the key-encryption key can be recorded in the form of an annotation recognizable by the content key conversion device and the encryption key provider device.

The content proxy device can further include an address conversion part configured to convert the address information of the encryption key to local address information, upon receiving the encryption key from the content key conversion device; and an index file generator part configured to generate a third index file including the address information of the encrypted content and the local address information, where the terminal connector part can transmit the third index file to the content operating device.

The terminal connector part can transmit an encryption key requested by the content operating device through the local address information.

Yet another aspect of the invention provides an HLS-based content provider device connected with a content proxy device over an external network. The content provider device includes: a first index file generator part configured to generate a first index file, which may include the address information of an encrypted content encrypted using an encryption key and the address information of the encryption key for decoding the encrypted content; a second index file generator part configured to generate a second index file, which may include the address information of the encrypted content, the address information of a double encryption key obtained by double-encrypting the encryption key using a key-encryption key, and the metadata of the key-encryption key; and a transmission part configured to receive a content provision request from the content proxy device over an external network and transmit a second index file corresponding to a content requested by a user, where the content proxy device is configured to transmit at least one of a double encryption key obtained by using the double encryption key address and the key-encryption key metadata for decrypting the double encryption key included in the second index file to a content key conversion device connected over a local network, and is configured to receive from the content key conversion device an encryption key, which may be obtained by decrypting the double encryption key of the encrypted content.

The HLS-based security processing system and method according to an embodiment of the invention can provide greater security of contents, as the key information used for encrypting a content can be provided safely from a server to a client.

Also, the HLS-based security processing system and method according to an embodiment of the invention enables the control of viewing authorization per content by using DRM, and can thereby improve safety, profitability, and convenience for the content provider, the service provider, and the user.

Additional aspects and advantages of the present invention will be set forth in part in the description which follows, and in part will be obvious from the description, or may be learned by practice of the invention.

DETAILED DESCRIPTION

The principles of the HLS-based security processing system and method according to certain aspects of the invention will be described below in more detail with reference to the accompanying drawings, using specific embodiments as examples. However, the drawings and detailed descriptions illustrate just one possible embodiment from among numerous embodiments to effectively describe the features of the invention. As such, the invention should not be understood as being limited to the drawings and descriptions that follow.

In the description of the invention set forth below, certain specific explanations of well-known functions or elements will be omitted if they are deemed to unnecessarily obscure the essence of the invention. The terminology used in the following include terms which were defined in consideration of the functions associated with the invention and which may change according to the intentions of the user or operator or according to custom, etc. The definitions of the terms should therefore be determined based on the overall concept of the invention.

In order to efficiently convey the core technical features of the invention, the embodiment described below will use terms that are suitably altered, integrated, or divided so as to allow clear understanding by a person having ordinary skill in the art, but it is to be appreciated that the invention is not thus limited.

An embodiment of the invention will be described below, using a specific example in which a user requests a content. It will be assumed that the content operating device requests the content proxy device for an encryption key for the content, receives a double encryption key for the encryption key from the content proxy device, and transmits an encryption key decrypted from the double encryption key to the user's operating device, to thereby display the content requested by the user via the content operating device.

An embodiment of the invention is described below in more detail with reference to the accompanying drawings.

Figure 1:
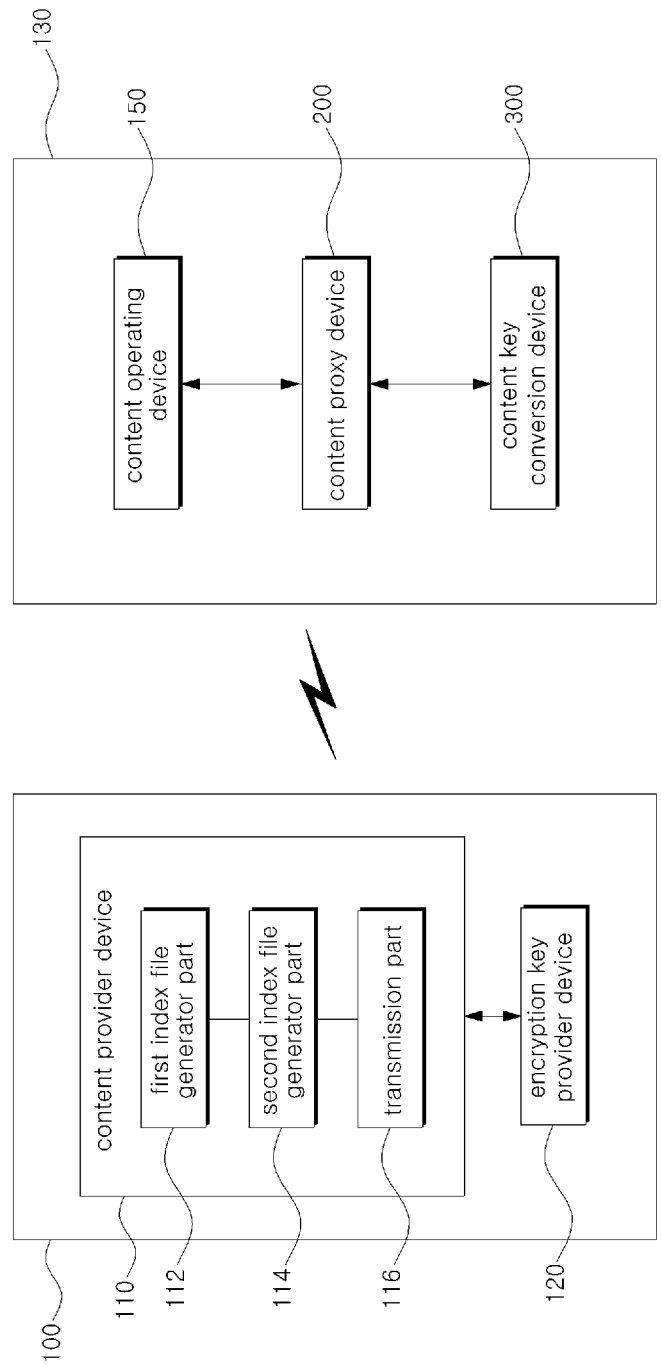
FIG. 1 is a diagram schematically illustrating an HLS-based security processing system according to an embodiment of the invention.

FIG. 1 is a diagram schematically illustrating an HLS-based security processing system according to an embodiment of the invention.

Referring to FIG. 1, the HLS-based security processing system may have a content operating device 150, a content proxy device 200, and a content key conversion device 300 connected over a local network 130. The HLS-based security processing system may connect with a content provider device 110 and an encryption key provider device 120 formed in an external network 100.

The content provider device 110 may store and manage contents for providing VOD and real time broadcasts requested by the content operating device 150. More specifically, in order to provide security for the contents, the content provider device 110 may encrypt a content based on an encryption key provided by the encryption key provider device 120 and thus convert it into an encrypted content. Here, the encrypted content can be a DRM (Digital Rights Management) content. The content provider device 110 may store the converted encrypted content. Here, the content provider device 110 can store the encrypted content by dividing it into data blocks of a particular size. The content provider device 110 may be located in an external network 100 and may connect with the content operating device 150 located in a local network to receive requests for contents from the content operating device 150. The content provider device 110 may transmit the requested content to the content operating device 150.

In order to transmit the encryption key to the content proxy device 200, the content provider device 110 may again encrypt the encryption key and thus generate a double encryption key. The content provider device 110 may transmit the double encryption key to the content proxy device 200.

As illustrated in FIG. 1, a content provider device 110 according to an embodiment of the invention can include a first index file generator part 112, a second index file generator part 114, and a transmission part 116.

A first index file generator part 112 according to an embodiment of the invention may generate a first index file that includes the address information of the encrypted content encrypted as above using the encryption key and the address information of the encryption key for decrypting the encrypted content.

In the related art, the conventional content provider device 110 transmits the first index file to the content operating device 150, and the content operating device 150 obtains the encrypted content and the encryption key by using the address information included in the first index file.

However, according to an embodiment of the invention, a second index file may be generated based on a first index file as described below, in order that the encryption key may not be exchanged via the external network.

The content provider device 110 according to an embodiment of the invention may again encrypt the encryption key to generate a double encryption key, where a key-encryption key can be used to convert the encryption key into the double encryption key.

Generating the double encryption key can be performed directly by the content provider device 110, or alternatively, can be performed by the encryption key provider device 120.

The second index file generator part 114 of the content provider device 110 may generate a second index file that includes at least one of the address information of the encrypted content, the address information of the double encryption key, and the metadata of the key-encryption key.

Here, the metadata of the key-encryption key can include information that enables the content key conversion device 300 to obtain the key-encryption key for decrypting the double encryption key back into the encryption key from the encryption key provider device 120, and can advantageously include the key-encryption key address information at the double encryption key provider device 120.

Advantageously, the key-encryption key metadata can be recorded in the form of an annotation that is recognizable by the content proxy device 200 and the content key conversion device 300.

Here, an index file can be defined as a playlist in that it includes information by which the content operating device 150 may replay contents. Although the description here uses an example in which just one content provider device 110 is present, the invention is not thus limited, and a multiple number of content provider devices 110 can be included, depending on the type of content or the content-providing company, etc., with the content proxy device 200 connecting to and receiving a content from a corresponding content provider device 110 according to the content requested by the user.

As described below, when there is a request from the content proxy device 200, the transmission part 116 may transmit a second index file, corresponding to the content requested by the user, to the content proxy device 200.

According to an embodiment of the invention, when there is a content request made by the user, the content operating device 150 may transmit the content request information to the content proxy device 200, and the content proxy device 200 may request the content provider device 110 for the index file of the requested content.

The content provider device 110 may extract the second index file for the requested content and transmit it to the content proxy device 200.

A second index file according to an embodiment of the invention may include encrypted content address information, double encryption key address information, and key-encryption key metadata, and the content proxy device 200 may transmit to the content key conversion device 300 the double encryption key obtained using the double encryption key address information and the key-encryption key address information included in the key-encryption key metadata.

The content key conversion device 300 may cooperate with the encryption key provider device 120 to decrypt the double encryption key into the encryption key.

The encryption key provider device 120 may store and manage the encryption key for providing security for the content. In other words, the encryption key provider device 120 may be formed on an external network 100, and may generate an encryption key that can encrypt a content and transmit the encryption key to the content provider device 110. Also, the encryption key provider device 120 may store key decryption information for decrypting the double encryption key by which the encryption key is encrypted.

Here, the key decryption information may be the key-encryption key used for converting the encryption key into the double encryption key as described above.

In cases where the content provided by the content provider device is provided as data blocks of a particular size, the key decryption information can be provided for each data block or each group of data blocks.

The content key conversion device 300, upon receiving a request from the content proxy device 200 to decrypt the double encryption key, may request the encryption key provider device 120 for the key decryption information, and the encryption key provider device 120 may transmit the key decryption information to the content key conversion device 300.

The content key conversion device 300 may use the key decryption information to convert the double encryption key into the encryption key and may transmit the converted encryption key to the content proxy device 200.

According to an embodiment of the invention, the content proxy device 200 may store the encryption key, received from the content key conversion device 300, in a storage part, and may convert the address information of the encryption key included in the second index file into local address information.

While the encryption key address of the second index file may be an address which the content operating device 150 can access via an external network, such as the content provider device 110 or the encryption key provider device 120, then the local address information can be an address related to the storage part of the content proxy device 200.

That is, according to an embodiment of the invention, the local address information may be an address that the content operating device 150 can access over a local network.

The content proxy device 200 according to an embodiment of the invention may generate a third index file, which includes the address information of the encrypted content and the local address information of the encryption key, and may transmit the third index file to the content operating device 150.

The content operating device 150 may parse the third index file to receive the encrypted content from the content provider device 110 and may receive the encryption key from the content proxy device 200 to replay the content. In this way, the content operating device 150 may receive a request for a content from a user and may display the requested content. Here, the content can be any one of various types of multimedia including broadcast programs such as movies, dramas, news, music videos, and commercials, still images such as photographs, music files, etc. In a specific example, the content operating device 150 may display a user interface (UI) screen that includes a multiple number of contents which the user may choose from. For example, the content operating device 150 can display a user interface screen including the highlight scenes, titles, authors, etc., of the contents. When a user selects one of the contents shown on the user interface screen, the content operating device 150 may transfer the content request information for the selected content to the content proxy device 200. The content request information can be IP information or URL information of the content provider device 110 that provides the content selected by the user. The content request information can further include content identification information for identifying the content requested by the user.

The content operating device 150 according to an embodiment of the invention can be operated in a separated form as a set-top box (not shown) which receives and replays the content and a display device (not shown) which displays the content according to the control of the set-top box.

As described above, the content operating device 150 may receive an encryption key from the content proxy device 200. The content operating device 150 may use the encryption key to decrypt the encrypted content received from the content provider device 110 and convert it into the content.

The content operating device 150 may display the converted content. Here, the content operating device 150 can display the content by way of a multimedia player. Here, the multimedia player may be a module capable of operating and displaying the content.

According to an embodiment of the invention, the content proxy device 200 may connect with the content provider device 110 of the external network 100 based on the content request information and receive the double encryption key.

The content proxy device 200 may store the received double encryption key. The content proxy device 200 may transmit the double encryption key to the content key conversion device 300 to receive the encryption key, obtained by decrypting the double encryption key. The content proxy device 200 may transmit the encryption key to the content operating device 150. The content proxy device 200 will be described below in more detail with reference to FIG. 2.

Although the description here uses an example in which the content proxy device 200 transmits the encryption key for a content to the content operating device 150, the invention is not thus limited, and it is also possible to store the encrypted contented received from the content provider device 110 and transmit the stored encrypted content to the content operating device 150.

The content key conversion device 300 may manage the key decryption information for decrypting the double encryption key. In other words, the content key conversion device 300 may receive the key decryption information for the content from the encryption key provider device 120 of the external network 100 and store the key decryption information. The content key conversion device 300 may receive the double encryption key of the content from the content proxy device 200. Also, the content key conversion device 300 may decrypt the double encryption key using the key decryption information to convert the double encryption key into the encryption key. The content key conversion device 300 may transmit the encryption key to the content proxy device 200. The content key conversion device 300 will be described below in more detail with reference to FIG. 3.

Although the description here uses an example in which the content operating device 150, content proxy device 200, and content key conversion device 300 are formed separately, the invention is not thus limited, and it is also possible to implement and operate the content operating device 150, content proxy device 200, and content key conversion device 300 in a single terminal.

Figure 2:
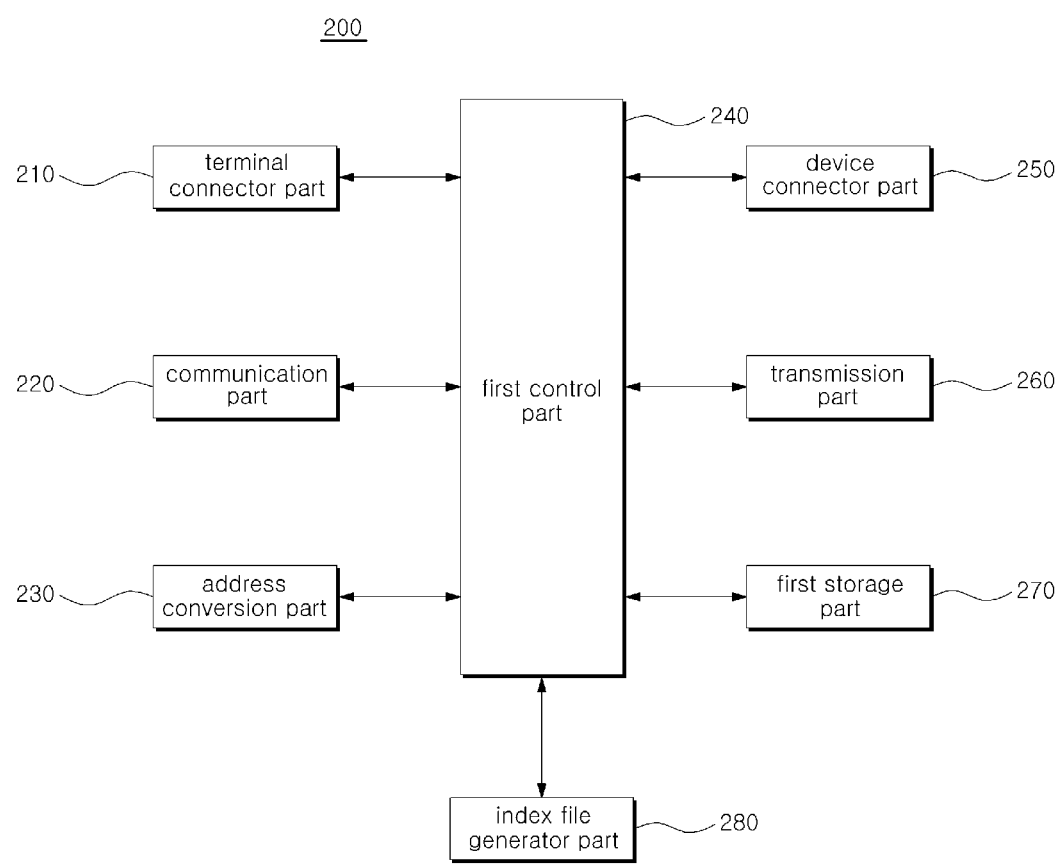
FIG. 2 is a block diagram illustrating the content proxy device of an HLS-based security processing system according to an embodiment of the invention.

FIG. 2 is a block diagram illustrating the content proxy device of an HLS-based security processing system according to an embodiment of the invention.

Referring to FIG. 2, the content proxy device 200 may include a terminal connector part 210, a communication part 220, an address conversion part 230, a first control part 240, a device connector part 250, a transmission part 260, a first storage part 270, and an index file generator part 280.

The terminal connector part 210 may connect with the content operating device 150 to receive data from the content operating device 150. In other words, the terminal connector part 210 may receive from the content operating device 150 the content request information by which to receive the content requested by the user. The communication part 220 may connect with the content provider device 110 to receive data from the content provider device 110. That is, the communication part 220 may connect to the content provider device 110 based on the content request information received from the content operating device 150 and may receive a second index file, which may include information related to the double encryption key for the content requested by the user, from the content provider device 110. A reason for receiving from the content provider device 110 a second index file related to the double encryption key, instead of a first index file including information related to the encryption key, is to strengthen the security for the encryption key by which the encrypted content is encrypted.

The communication part 220 may receive the double encryption key from the content provider device 110, using the double encryption key address information included in the second index file, and may store it in the first storage part 270.

The double encryption key can also be received from the encryption key provider device 120.

Using the encryption key address information included in the second index file, the address conversion part 230 may convert the address information of the encryption key for the double encryption key received from the content key conversion device 300 into local address information.

The index file generator part 280 may generate a third index file that includes the address information of the encrypted content and the local address information above.

The first control part 240 may control the overall operation of the content proxy device 200. That is, the first control part 240 may serve to control the components of the content proxy device 200 such as the terminal connector part 210, communication part 220, address conversion part 230, device connector part 250, transmission part 260, and first storage part 270.

For example, the first control part 240 can control the communication part 220 to connect with the content provider device 110 based on the content request information. When the double encryption key is received by way of the communication part 220, the first control part 240 can control the first storage part 270 to store the received double encryption key in the first storage part 270. The first control part 240 can control the address conversion part 230 to convert the address of the encryption key at the address conversion part 230. When the encryption key is received by way of the device connector part 250, the first control part 240 can control the transmission part 260 to transmit the received encryption key to the content operating device 150.

The first control part 240 can also control the transmission part to transmit the converted local address information to the content operating device 150.

The device connector part 250 may connect with the content key conversion device 300 to receive data from the content key conversion device 300 or transmit data to the content key conversion device 300. That is, the device connector part 250 may transmit the double encryption key to the content key conversion device 300 in order to decrypt the double encryption key. The device connector part 250 can also transmit only the key identification information to the content key conversion device 300 in order to request a decrypting of the double encryption key. Here, the key identification information may be information by which to identify the encryption key. Also, the device connector part 250 may receive the encryption key, which may be obtained by decrypting the double encryption key at the content key conversion device 300.

The transmission part 260 may transmit data to the content operating device 150. In other words, the transmission part 260 can transmit to the content operating device 150 a third index file, including the local address information for the encryption key converted at the address conversion part 230 and the encrypted content address information. Here, the content operating device 150 can connect to the content proxy device 200 based on the local address information to request an encryption key for decrypting the encrypted content.

The first storage part 270 may store various programs for controlling the overall operation of the content proxy device 200 as well as various data generated by or obtained for executing the programs. For example, the first storage part 270 can store the double encryption key received from the content provider device 110 by way of the communication part 220. The first storage part 270 can store the encryption key received by way of the device connector part 250. The first storage part 270 can store the local address information for the encryption key converted at the address conversion part 230.

Also, the first storage part 270 can provide the data needed by the terminal connector part 210, communication part 220, address conversion part 230, first control part 240, device connector part 250, and transmission part 260 upon request.

Figure 3:
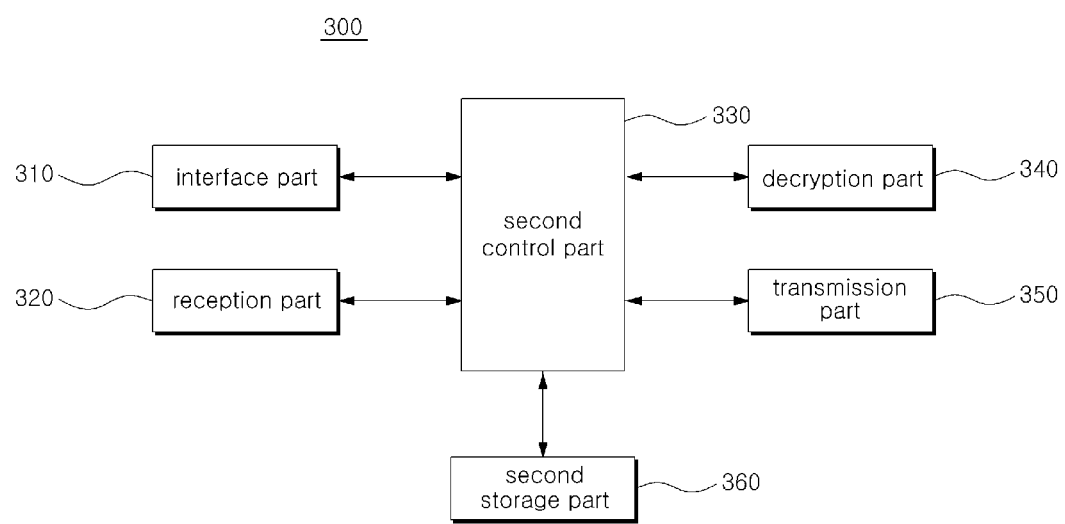
FIG. 3 is a block diagram illustrating the content key conversion device of an HLS-based security processing system according to an embodiment of the invention.

FIG. 3 is a block diagram illustrating the content key conversion device of an HLS-based security processing system according to an embodiment of the invention.

Referring to FIG. 3, the content key conversion device 300 may include an interface part 310, a reception part 320, a second control part 330, a decryption part 340, a transmission part 350, and a second storage part 360.

The interface part 310 may connect with the encryption key provider device 120 located in an external network 100 to receive data from the encryption key provider device 120. That is, the interface part 310 may request the encryption key provider device 120 for key decryption information needed for decrypting the double encryption key.

As described above, the key decryption information may be a key-encryption key used in converting the encryption key into the double encryption key.

The interface part 310 may receive the key decryption information of the content from the encryption key provider device 120. Here, the interface part 310 can also receive the key identification information and the double encryption key, together with the key decryption information of the content.

The reception part 320 may connect with the content proxy device 200 to receive data from the content proxy device 200. In other words, the reception part 320 may receive the double encryption key of the encrypted content from the content proxy device 200 in order to request a decryption of the double encryption key. Here, the double encryption key can include a double encryption key for one or multiple data blocks of a particular size into which the encrypted content may be divided. The second control part 330 may control the overall operation of the content key conversion device 300. That is, the second control part 330 may serve to control the components of the content key conversion device 300 such as the interface part 310, reception part 320, decryption part 340, transmission part 350, and second storage part 360.

For example, when the key decryption information is received by way of the interface part 310, the second control part 330 can control the second storage part 360 to store the key decryption information in the second storage part 360 in a matching relationship with the content identification information. When the double encryption key is received by way of the reception part 320, the second control part can control the decryption part 340 such that the double encryption key is provided to the decryption part 340 and the double encryption key is decrypted at the decryption part 340. When the double encryption key is decrypted into the encryption key at the decryption part 340, the second control part 330 can provide the control for transmitting the encryption key to the content proxy device 200.

The decryption part 340 may decrypt the double encryption key into the encryption key. In other words, the decryption part 340 may search the content identification information, received together with the double encryption key, in the second storage part 360, extract the same content identification information, and then extract the key decryption information matching the content identification information. The decryption part 340 may decrypt the double encryption key received from the content proxy device 200 based on the extracted key decryption information and convert it into the encryption key. A reason for converting a double encryption key into an encryption key in this manner is to convert the double encryption key into the encryption key, which is the information necessary for decrypting the encrypted content.

In cases where only content identification information is received from the content proxy device 200 via the reception part 320, the decryption part 340 may extract the key decryption information and double encryption key matching the content identification information in the second storage part 360. The decryption part 340 may decrypt the extracted double encryption key based on the key decryption information and convert it into the encryption key.

The transmission part 350 may connect with the content proxy device 200 and transmit data to the content proxy device 200. That is, the transmission part 350 may transmit the encryption key decrypted at the decryption part 340 to the content proxy device 200. Here, the transmission part 350 can also transmit an encryption key to the content proxy device 200 for one or multiple data blocks of a particular size to which the encrypted content may be divided.

The second storage part 360 may store various programs for controlling the overall operation of the content key conversion device 300 as well as various data generated by or obtained for executing the programs. For example, the second storage part 360 can store the key decryption information of the encrypted content received from the encryption key provider device 120 and the double encryption key. The second storage part 360 can also store the key decryption information in a matching relationship with the content identification information. The second storage part 360 can store the double encryption key received by way of the reception part 320. The second storage part 360 can store the encryption key obtained by the decryption part 340 decrypting the double encryption key.

The second storage part 360 can provide the data needed by the interface part 310, reception part 320, second control part 330, decryption part 340, and transmission part 350 upon request.

In the foregoing, the description is provided using an example in which the content key conversion device 300 stores the key decryption information beforehand and converts the double encryption key into the encryption key using the key decryption information when the double encryption key is received from the content proxy device 200.

However, the invention is not limited to the example above; the content key conversion device 300 can receive the key-encryption key metadata together with the double encryption key from the content proxy device 200, receive the key-encryption key from the encryption key provider device 120 using the address information included in the key-encryption key metadata, and convert the double encryption key into the encryption key using the key-encryption key.

Figure 4:
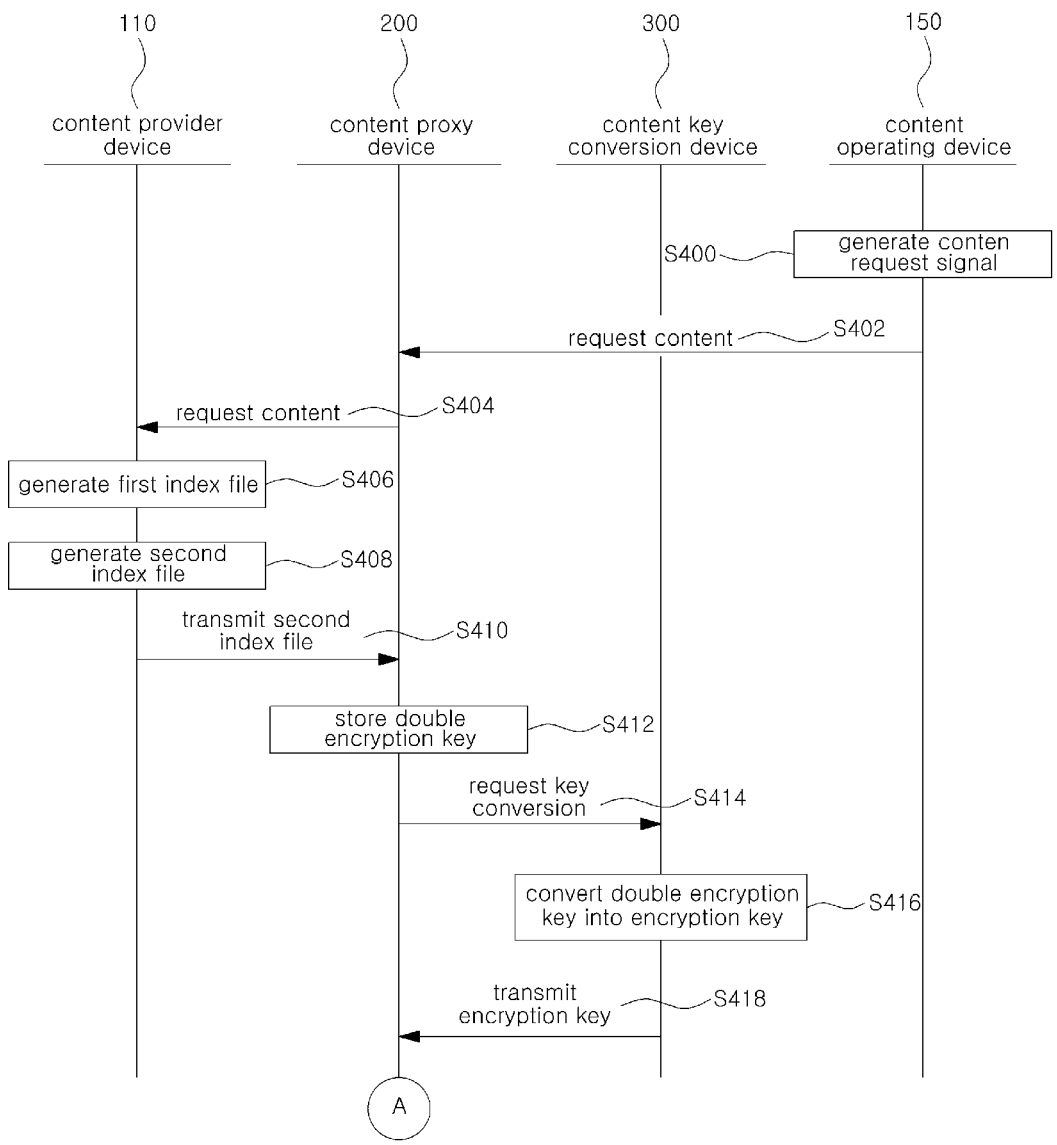
FIG. 4 and FIG. 5 are flow diagrams illustrating an HLS-based security processing method according to an embodiment of the invention.
Figure 5:
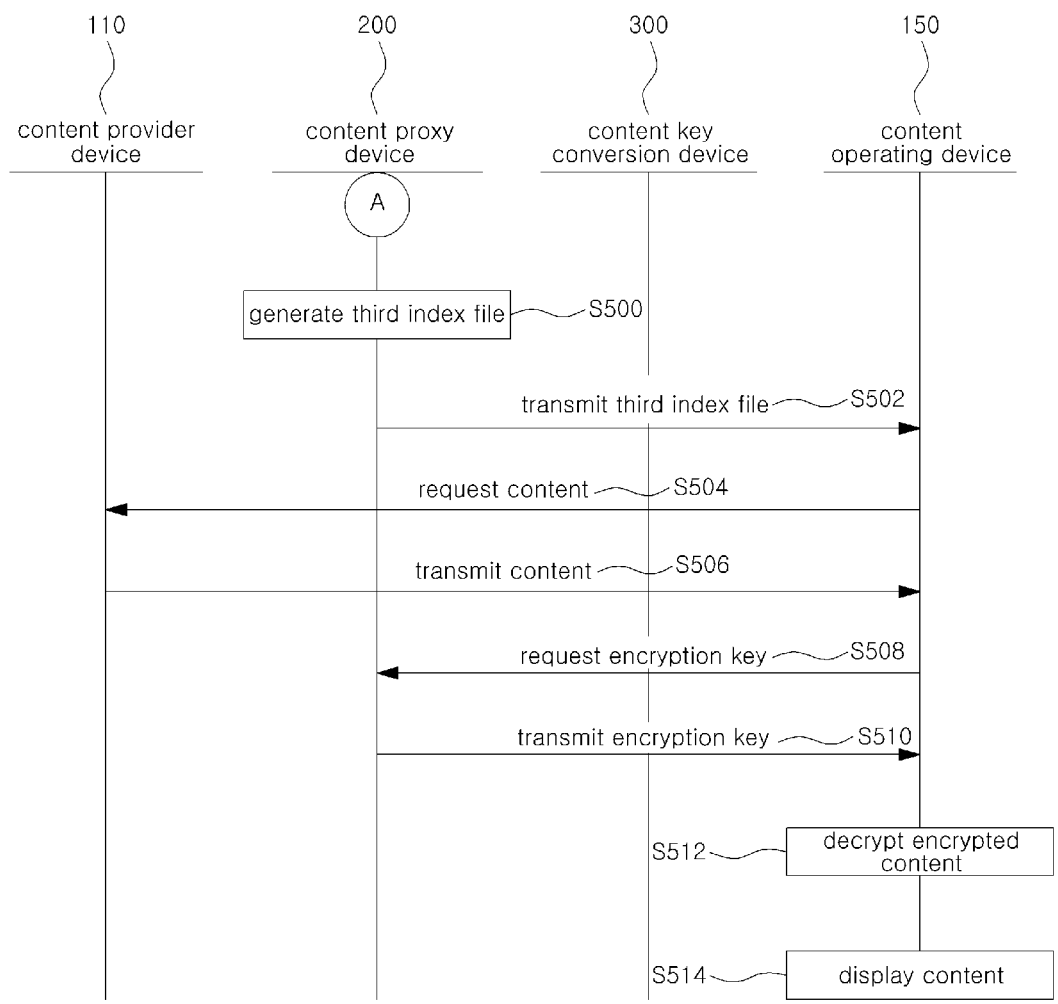

FIG. 4 and FIG. 5 are flow diagrams illustrating an HLS-based security processing method according to an embodiment of the invention.

Referring to FIGS. 4 and 5, when a user requests a content, the content operating device 150 may generate content request information regarding the content requested by the user (step 400).

The content operating device 150 may transmit the generated content request information to the content proxy device 200 (step 402).

Based on the content request information, the content proxy device 200 may request the content provider device 110 for an index file of the content (step 404).

The content provider device 110 may transmit the index file for the requested content to the content proxy device 200 (step 410). Here, the content provider device 110 may generate a first index file that includes address information for an encrypted content divided into data blocks of a particular size and address information for the encryption key used in encrypting the content (step 406), encrypt the encryption key with a key-encryption key to generate a double encryption key, generate a second index file that includes the address information for the encrypted content, the double encryption key address information, and metadata of the key-encryption key (step 408), and transmit the generated second index file to the content proxy device 200.

While FIG. 4 illustrates an example in which the first and second index files are generated after a content request is received from the content proxy device 200, it is also possible to have the content provider device 110 generate the index files for each content beforehand.

The content proxy device 200 may parse the second index file received from the content provider device 110 and may store the double encryption key obtained using the double encryption key address information (412). Here, the content proxy device 200 can store a double encryption key for each data block of a particular size to which the encrypted content may be divided.

The content proxy device 200 may transmit a key conversion request, including the double encryption key and the key-encryption key metadata, to the content key conversion device 300 (step 414).

The content key conversion device 300 may convert the double encryption key into the encryption key (416).

That is, the content key conversion device 300 may receive the key-encryption key, i.e. the key decryption information, from the encryption key provider device 120 by using the address information included in the key-encryption key metadata, and use it to convert the double encryption key into the encryption key.

The content key conversion device 300 may transmit the converted encryption key to the content proxy device 200 (418).

Referring to FIG. 5, the content proxy device 200 may convert the address information of the encryption key received from the content key conversion device 300 to generate a third index file (500).

As described above, the content proxy device 200 may convert the encryption key address information of the second index file into its local address information, and may generate a third index file that includes the local address information converted as above and the encrypted content's address information.

The content proxy device 200 may transmit the generated third index file to the content operating device 150 (step 502).

Based on the encrypted content address information included in the third index file, the content operating device 150 may connect with the content provider device 110 to request the content provider device 110 for the content requested by the user (step 504). Here, the outside content address information may be information that indicates the area where the content requested by the user is encrypted and stored in the content provider device 110.

When the content operating device 150 makes a connection by way of the outside content address information, the content provider device 110 may extract the encrypted content stored at the outside content address information and may transmit the extracted encrypted content to the content operating device 150 (step 506).

Also, the content operating device 150 may use the local address information obtained by parsing the third index file to request the content proxy device 200 for the encryption key (step 508), receive from the content proxy device 200 the encrypted content received from the content provider device 110 (step 510), and decrypt it based on the encryption key to convert it into the content (step 512).

The content operating device 150 may display the decrypted content (step 514).

While the spirit of the invention has been described in detail with reference to particular embodiments, a person skilled in the art would understand that numerous variations and modifications can be conceived without departing from the spirit and scope of the invention defined by the claims appended below.

What is claimed is:

1. A content key conversion device comprising:
   a processor configured to control:
      a reception part that receives a double encryption key of an encrypted content from a content proxy device, the encrypted content provided by a content provider device of an external network;
      an interface part that receives a key-encryption key corresponding to the double encryption key from an encryption key provider device of an external network; and
      a transmission part that transmits an encryption key, converted by decrypting the double encryption key of the encrypted content using the key-encryption key, to the content proxy device, wherein
   the content key conversion device is connected over a local network to the content proxy device,
   the content proxy device is connected over the local network to a content operating device on which the encrypted content is consumed by a user and transmits the encryption key to the content operating device,
   the reception part receives metadata of the key-encryption key from the content proxy device,
   the interface part receives the key-encryption key from the encryption key provider device using address information included in the metadata of the key-encryption key, and
   the content provider device is configured to:
      generate a first index file, the first index file including address information of the encrypted content and address information of the encryption key for decrypting the encrypted content,
      generate a second index file based on the first index file, the second index file including address information of the encrypted content, address information of a double encryption key obtained by double-encrypting the encryption key using a key-encryption key, and metadata of the key-encryption key, and
      upon receiving a request to replay a content from the user, transmit the second index file of the requested content to the content proxy device.

2. The content key conversion device of claim 1, wherein the content provided by the content provider device is provided as data blocks of a particular size, and the key decryption information is provided for each data block or for each group of data blocks.

3. The content key conversion device of claim 2, wherein the metadata of the key-encryption key is recorded in a form of an annotation recognizable by the content key conversion device and the encryption key provider device.

4. A content proxy device located in a local network, the content proxy device comprising:
   a processor configured to control:
      a terminal connector part that connects with a content operating device over the local network and receives a content request signal from the content operating device;
      a communication part that connects with a content provider device of an external network and receives a double encryption key of an encrypted content and metadata of a key-encryption key corresponding to the double encryption key from the content provider device based on the content request signal received from the content operating device;
      a storage part that stores the double encryption key received from the content provider device;
      a device connector part that transmits the double encryption key of the encrypted content and the metadata of the key-encryption key to a content key conversion device of the local network and receives an encryption key from the content key conversion device, the encryption key obtained by decrypting the double encryption key of the encrypted content; and
      a transmission part that transmits the encryption key converted by the content key conversion device to the content operating device on which the encrypted content is consumed by a user, wherein
   the content key conversion device receives the key-encryption key from the encryption key provider device using address information included in the metadata of the key-encryption key, and
   the content provider device is configured to:
      generate a first index file, the first index file including address information of the encrypted content and address information of the encryption key for decrypting the encrypted content,
      generate a second index file based on the first index file, the second index file including address information of the encrypted content, address information of a double encryption key obtained by double-encrypting the encryption key using a key-encryption key, and metadata of the key-encryption key, and
      upon receiving a request to replay a content from the user, transmit the second index file of the requested content to the content proxy device.

5. The content proxy device of claim 4, wherein the encrypted content is divided into data blocks of a particular size, and
   the storage part stores double encryption key information for each of the data blocks having a particular size.

6. The content proxy device of claim 4, wherein the communication part receives the second index file from the content provider device, and
- the device connector part transmits to the content key conversion device the double encryption key obtained using the double encryption key address and the key-encryption key metadata for decrypting the double encryption key included in the second index file.

7. The content proxy device of claim 4, wherein the metadata of the key-encryption key is recorded in a form of an annotation recognizable by the content key conversion device and the encryption key provider device.

8. The content proxy device of claim 4, further comprising:
- an address conversion part configured to convert address information of the encryption key to local address information, upon receiving the encryption key from the content key conversion device; and
- an index file generator part configured to generate a third index file including address information of the encrypted content and the local address information,
- wherein the terminal connector part transmits the third index file to the content operating device.

9. The content proxy device of claim 8, wherein the terminal connector part transmits an encryption key requested by the content operating device through the local address information.

10. An HLS-based content provider device connected with a content proxy device over an external network, the content provider device comprising:
- a processor configured to control:
  - a first index file generator part that generates a first index file, the first index file including address information of an encrypted content encrypted using an encryption key and address information of the encryption key for decoding the encrypted content;
  - a second index file generator part that generates a second index file, the second index file including the address information of the encrypted content, address information of a double encryption key obtained by double-encrypting the encryption key using a key-encryption key, and metadata of the key-encryption key; and
  - a transmission part that receives a content provision request from the content proxy device over the external network and transmits the second index file corresponding to a content requested by a user, wherein the content proxy device is configured to transmit at least one of the double encryption key and the metadata of the key-encryption key for decrypting the double encryption key included in the second index file to a content key conversion device connected over a local network, receive the encryption key from the content key conversion device, the encryption key obtained by decrypting the double encryption key of the encrypted content, and transmit the encryption key to a content operating device on which the encrypted content is consumed by the user, the content proxy device being connected over the local network to the content operating device, and the content key conversion device receives the key-encryption key from the encryption key provider device using address information included in the metadata of the key-encryption key.

* * * * *